Aug. 11, 1953  L. M. PUSTER  2,648,251
FIBER LENGTH DISTRIBUTION MEASURING INSTRUMENT
Filed July 2, 1947  6 Sheets-Sheet 1

Inventor
Louis M. Puster.
By Cameron, Kerkam + Sutton
Attorneys

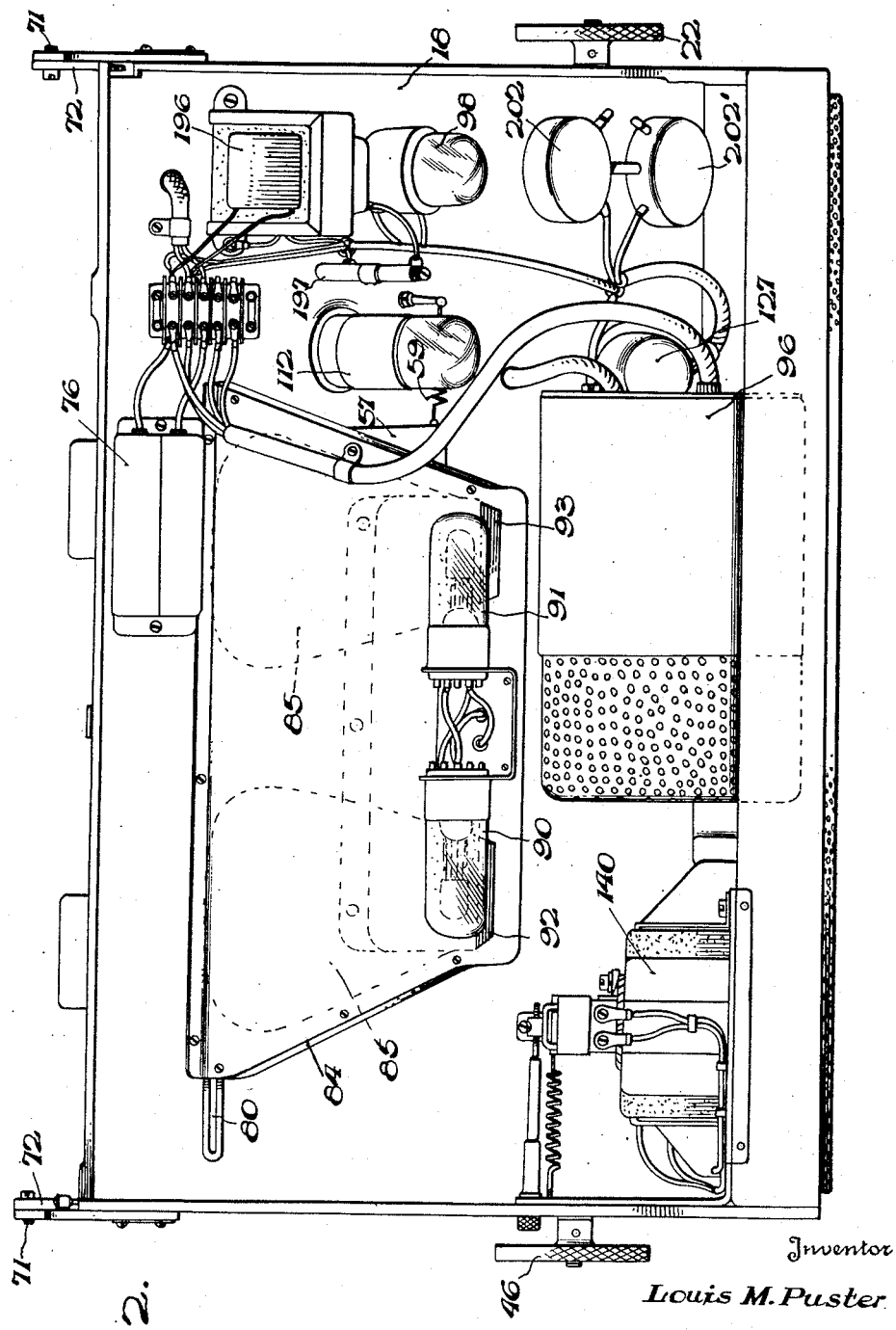

Aug. 11, 1953           L. M. PUSTER           2,648,251
FIBER LENGTH DISTRIBUTION MEASURING INSTRUMENT
Filed July 2, 1947           6 Sheets-Sheet 3
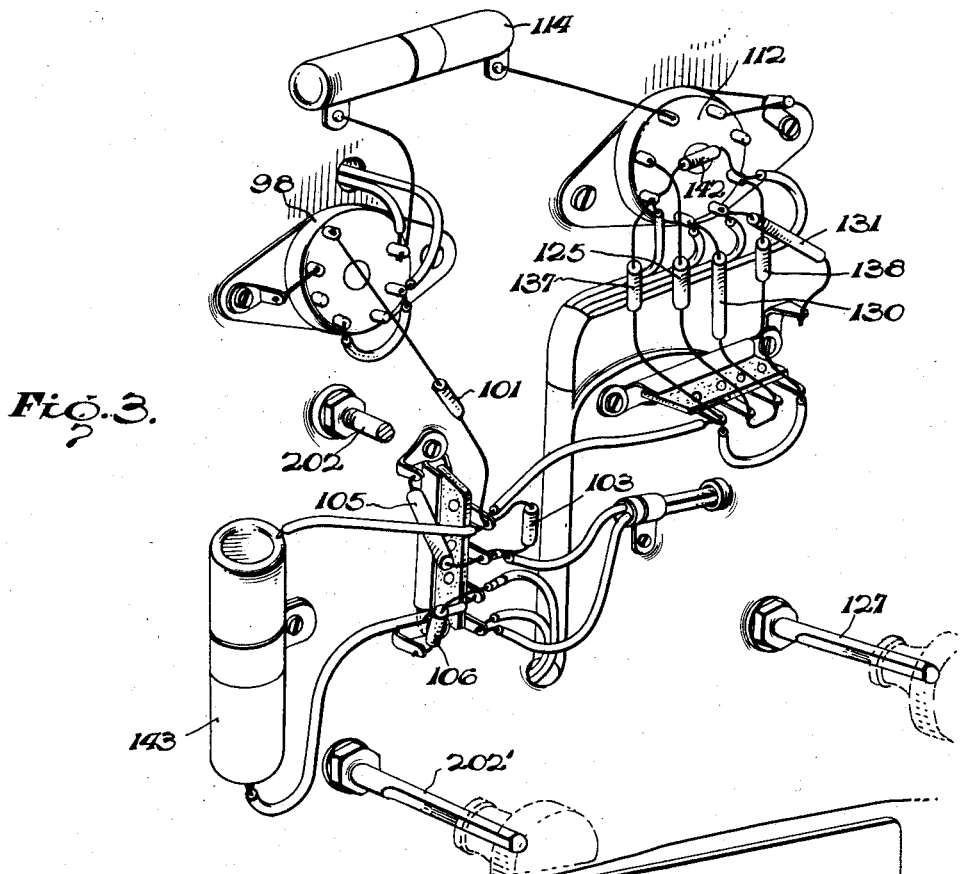
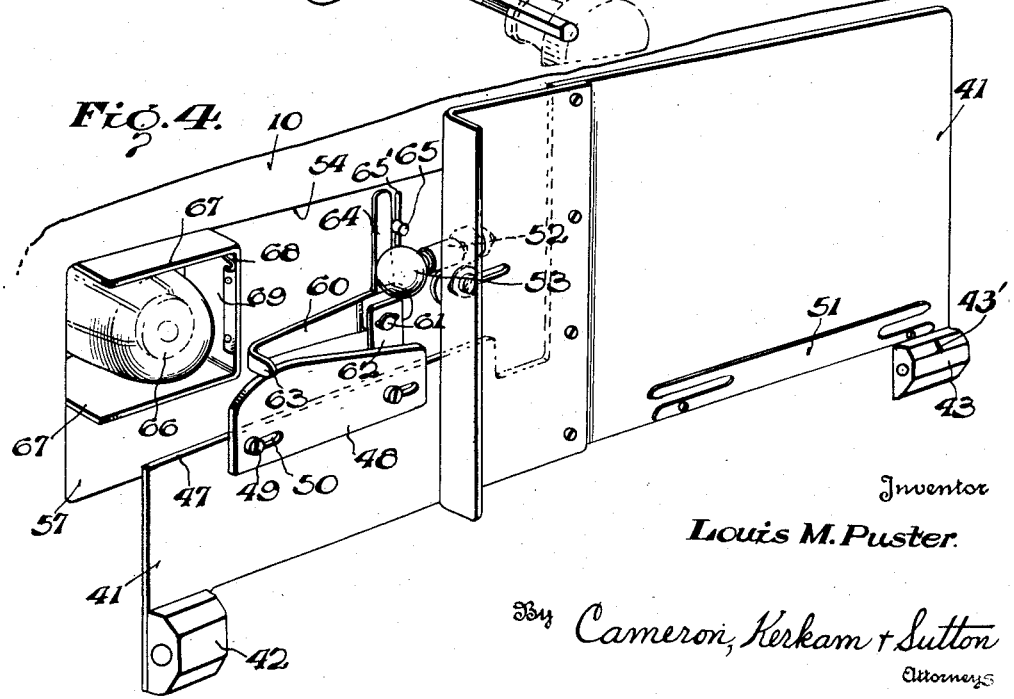
Inventor
Louis M. Puster.
By Cameron, Kerkam & Sutton
Attorneys Aug. 11, 1953  L. M. PUSTER  2,648,251
FIBER LENGTH DISTRIBUTION MEASURING INSTRUMENT
Filed July 2, 1947  6 Sheets-Sheet 4

Inventor
Louis M. Puster
By Cameron, Kerkam + Sutton
Attorneys

Aug. 11, 1953 L. M. PUSTER 2,648,251
FIBER LENGTH DISTRIBUTION MEASURING INSTRUMENT
Filed July 2, 1947 6 Sheets-Sheet 6

INVENTOR.
Louis M. Puster.
BY
Cameron, Kerkam & Sutton
Attorneys

Patented Aug. 11, 1953

2,648,251

UNITED STATES PATENT OFFICE 2,648,251

FIBER LENGTH DISTRIBUTION MEASURING INSTRUMENT

Louis M. Puster, Knoxville, Tenn., assignor, by mesne assignments, to The University of Tennessee Research Corporation, Knoxville, Tenn., a corporation of Tennessee Application July 2, 1947, Serial No. 758,663

6 Claims. (Cl. 88—14)

The invention relates to measuring instruments and more particularly to instruments for measuring the lengths and distribution of fibers.

Heretofore various fiber measuring devices have been proposed among these being that disclosed in the United States Patent No. 2,299,983, issued to Kenneth L. Hertel on October 27, 1942. In this device two photoelectric cells are connected in series and a galvanometer is connected across them in parallel. A single source of light radiates to both cells. A sample of cotton is moved between the sources of light and one cell and a lens with a variable aperture adjusted between the source of light and the second cell so that at any given moment the light entering both cells is equal, any unbalance being shown by the galvanometer. The motion imparted to the sample and the motion of adjustment of the lens are mechanically transmitted to a pen and a length distribution curve is traced. This curve when suitably analyzed indicates fiber length and cumulative numbers of fibers.

Difficulty has been experienced in these prior devices in obtaining initial adjustment with standard samples to provide accurate length distribution curves and in adjustment of the lens apertures to balance the cells. Adjustments have been possible only by the use of complicated structures which are in themselves difficult to maintain in correct operating relationship.

The present invention overcomes these prior difficulties and resulting inaccuracies by employing one source of light for the light responsive device for analyzing the fiber samples and a second source of light for the light responsive device employed to balance the galvanometer. Instead of employing adjustable lenses between the second source of light and its light responsive device the second source of light is moved with respect to the balancing light responsive device to vary the intensity of light entering the light responsive device to balance the galvanometer. This movement and the movement of the samples are mechanically transmitted to a pen to trace a fiber length distribution curve. The amount of light transmitted through the sample has been found to approximate an exponential function while the amount of light transmitted to the balancing light responsive device is in proportion to the inverse square of the distance between the source of light and the light responsive device. A correction must therefore be made to compensate automatically for the difference of functions if the length distribution curve is to be accurate. This correction is most advantageously supplied in the present invention by moving the balancing light responsive device with respect to its source of light. This movement may be imparted by utilizing a cam surface moved by the motion of the source of light for the balancing light responsive device.

It is accordingly an object of the present invention to provide a novel fiber measuring device in which the movements of the fiber samples with respect to a light responsive device and the movement of a source of light with respect to a balancing light responsive device are mechanically utilized to trace a fiber length distribution curve.

Another object of the present invention is to provide such a novel device in which the balancing light responsive device is moved with respect to its source of light as its source of light is moved with respect to the balancing light responsive device to correct automatically the difference in functions of the light passed through the samples and the light received by the balancing light responsive device.

Another object of the present invention is to provide such a device in which no adjustable lenses or complicated mechanical structures are required to regulate the amount of light received by the balancing light responsive device.

Another object of the present invention is to provide such a device which will require a minimum of adjustment after initial adjustment by the maker.

Another object of the present invention is to provide such a measuring device having a minimum of moving parts.

Another object of the present invention is to provide novel means for imparting movement to the balancing light responsive device with respect to its source of light.

Another object of the present invention is to provide a novel electric circuit for the light responsive devices and associated galvanometer.

Another object of the present invention is to provide such a novel measuring device which is simple to use, compact, durable and of dependable and accurate operation.

Other and further objects of the present invention will appear as the description thereof proceeds.

One embodiment of the present invention is shown in the accompanying drawings and is described hereinafter to illustrate this invention. This should not be construed as defining the scope of the inventive concept but reference should be had to the appended claims for this purpose.

In these drawings, in which like reference numerals indicate similar parts,

Fig. 2 is a rear view of the embodiment of Fig. 1 with the back plate removed to show the electrical wiring, the relative positions of the several elements and with the cover of the phototubes removed;

Fig. 3 is an enlarged view of a portion of the electrical circuit shown in Fig. 1;

Fig. 4 is an enlarged view of the means shown in Fig. 1 for imparting movement to the balancing light responsive device;

Figure 1:
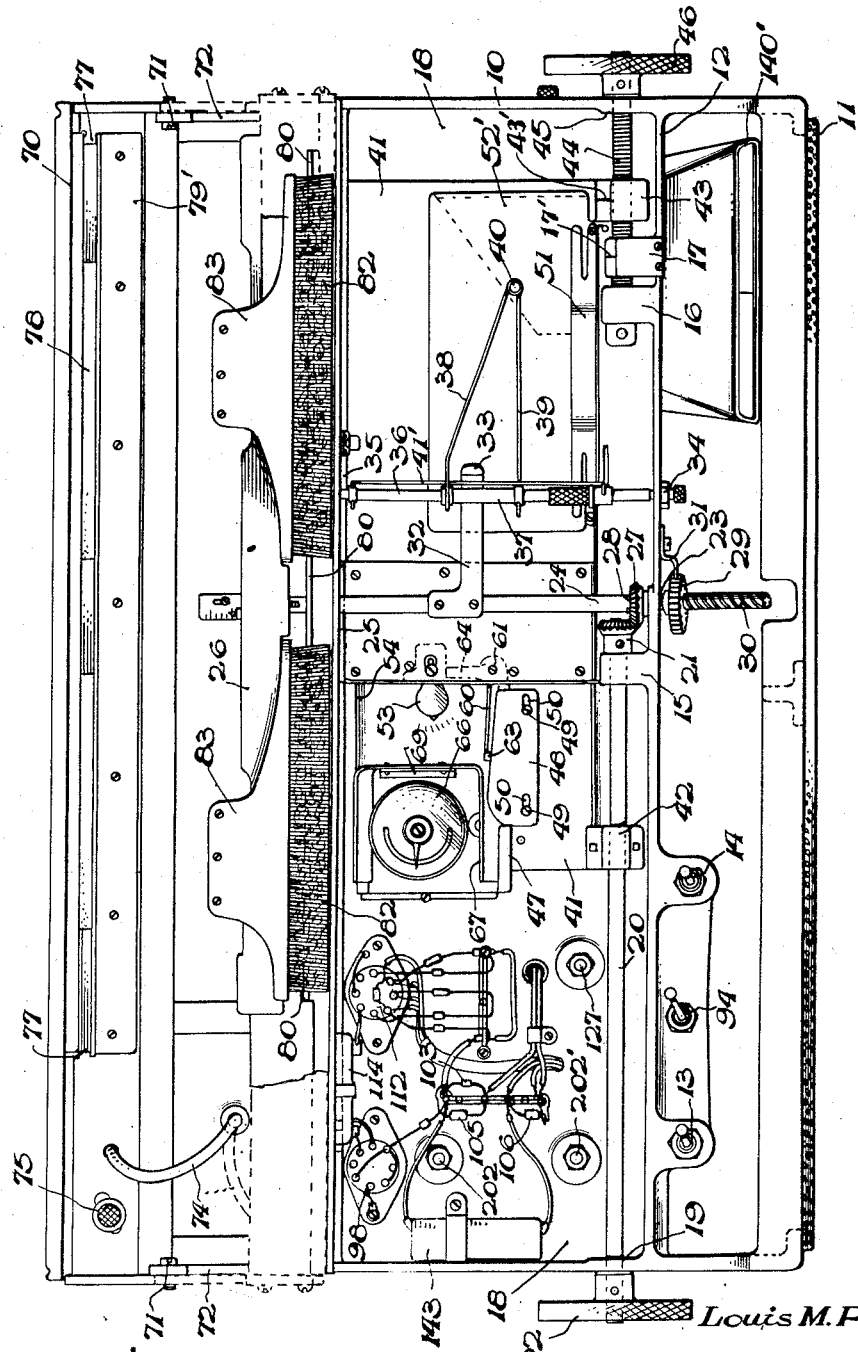
Fig. 1 is a front view of an embodiment of this invention with the face plate removed to show a part of the electrical wiring and with the light source for the sample analysing light responsive device rotated to its raised position to show the samples in analysing position.

In the several figures and in particular in Fig. 1 the embodiment of the invention here shown may be provided with any suitable casing or housing 10, which may be provided with front and back cover plates here omitted for purposes of clarity, and said housing may be mounted upon a resilient pad 11. Supported within housing 10 is support member 12 which carries switches 13, 14 and 94, bearings 15 and 16 and element 17 bearing indicia 17'. Support member 12 also carries panel 18 which extends across the width and height of housing 10 and divides the same into two compartments.

Housing 10 at 19 provides a suitable bearing for shaft 20 which extends through bearing 15 to rotate bevel gear 21. Rotation is imparted to shaft 20 by hand wheel 22. Support 12 at 23 provides a suitable bearing for a vertically disposed shaft 24 which passes through partition 25 and carries cross member 26. Vertical reciprocating movement is imparted to shaft 24 by bevel gear 27 which slidably engages squared portion 28 of shaft 24 and meshes with bevel gear 21, and by gear 29 which engages threaded portion 30 of shaft 24 and which is held against rotation by finger 31. Secured to shaft 24 for reciprocating vertical movement therewith is pen actuating arm 32 which terminates in pen engaging extension 33.

Suitably supported in bearings 34 and 35 carried by support 12 and partition 25 respectively is shaft 36 upon which sleeve 37 is slidably mounted. Sleeve 37 carries arms 38 and 39 which terminate in pen holder 40. A spring 41' urges arms 38 and 39 and pen holder 40 toward partition 18 and into position for engagement of arm 38 by extension 33 as it moves upwardly.

Referring now to Figs. 1 and 4, a panel member 41 provided with a bearing 42 and internally threaded projection 43 is mounted for reciprocating movement behind shafts 24 and 37 and parallel to panel 18, bearing 42 sliding upon shaft 20 and threaded projection 43 engaging threaded shaft 44 which rotates in bearing 16 and in aperture 45 in housing 10. Shaft 44 is rotated by hand wheel 46. Projection 43 is provided with indicia 43' for registration with the indicia 17' carried by member 17. Member 41 is of reduced width at 47 and carries cam 48 adjacent thereto, cam 48 being adjustably mounted by virtue of clamping screws 49 and slots 50. Any suitable spring clip 51 is secured to panel 41 to hold a card 52' under pen holder 40. Panel 41 also supports a light socket 52 carrying light 53.

Figure 5:
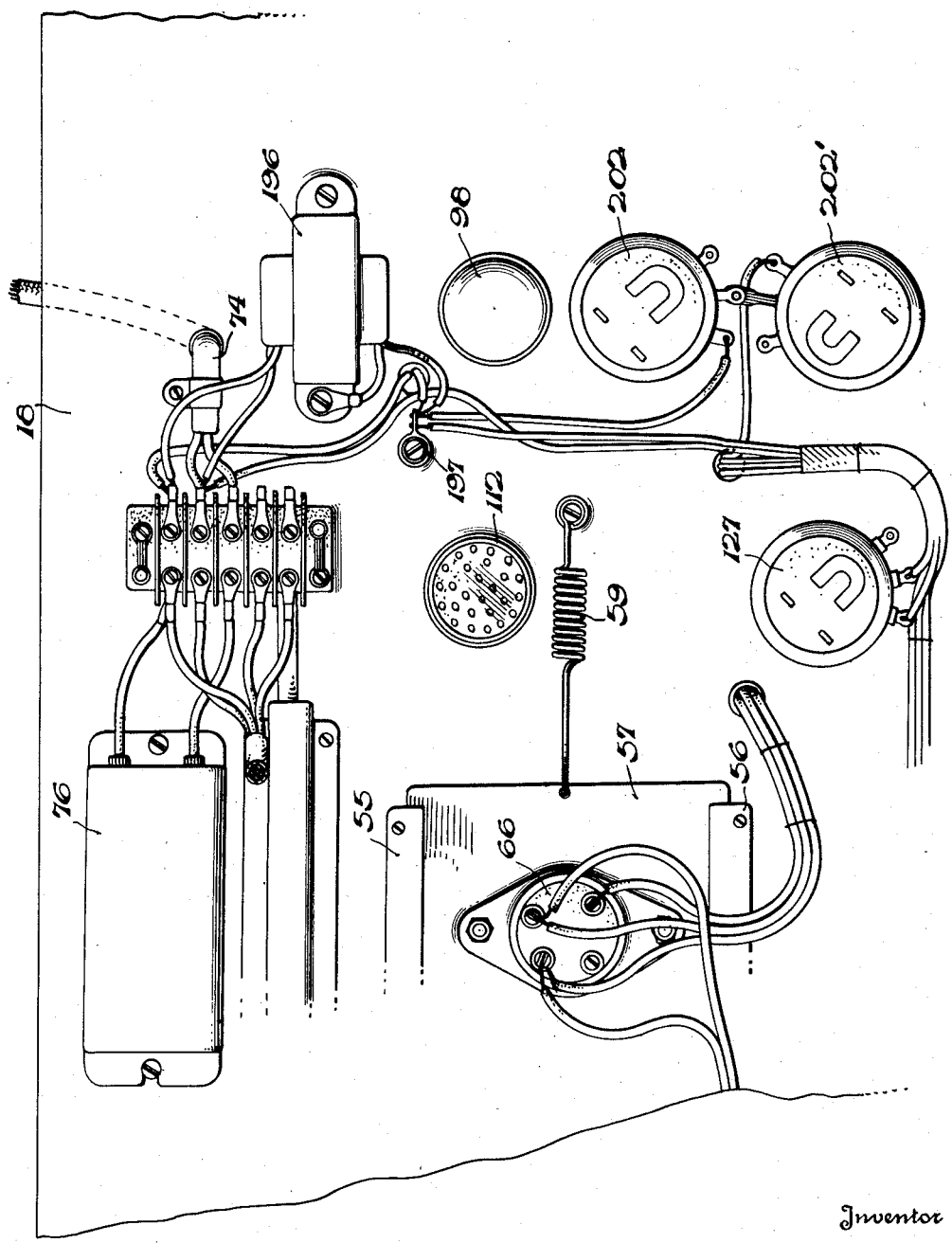
Fig. 5 is an enlarged view of a part of the electrical circuit seen in Fig. 2.

Panel 18 is cut away at 54 and has tracks 55 and 56 secured to its reverse side, as seen in Fig. 5, to receive a panel 57 for reciprocating movement therein. A spring 59 (Figs. 2 and 5) biases panel 57 to the left as seen in Fig. 1. Reciprocating movement is imparted to panel 57 by bell crank lever 60 pivoted at 61 to extension 62 of panel 18 and engaging cam 48 by turned extension 63, the other arm 64 of bell crank 60 being in contact with pin 65 adjustably secured in slot 65' in panel 57. Panel 57 supports a suitable light responsive device here shown as a vacuum phototube 66, disposed opposite light 53. Tube 66 may be protected from extraneous light by shield 67 apertured at 68 and provided with a suitable light filter 69.

Figure 7:
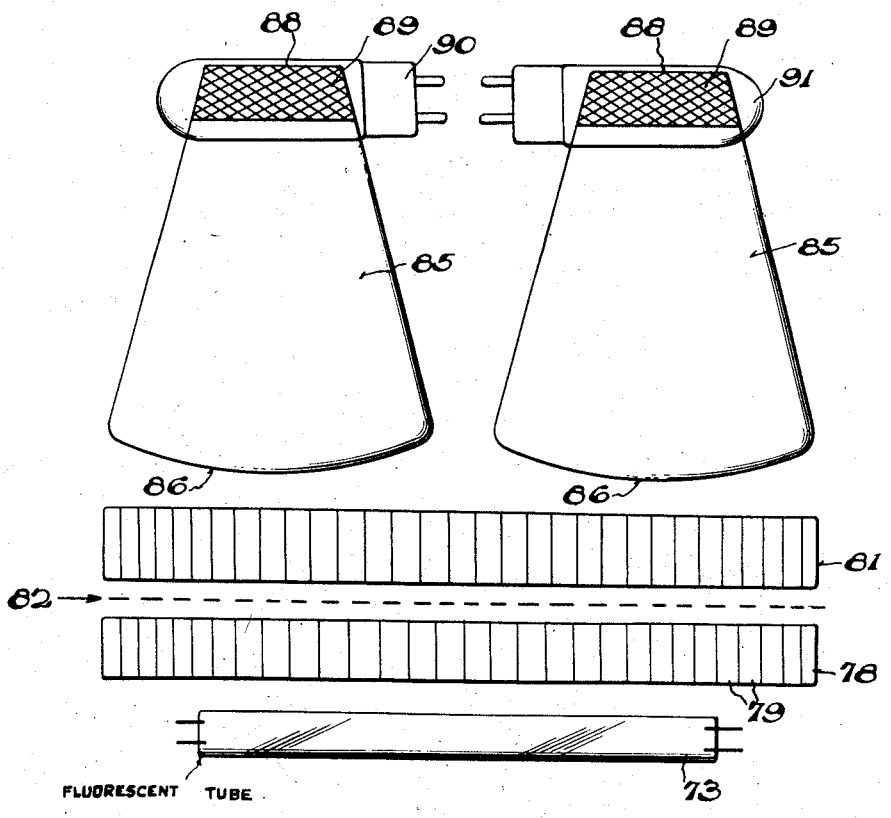
Fig. 7 is a diagrammatic view of the lenses and collimators employed to direct the light through the sample being measured and to transmit the light passed by the sample to the analyzing light responsive device.

A suitable housing 70 is hinged at 71 to hinge elements 72 secured to housing 10 and carries fluorescent tube 73 (Fig. 7). Tube 73 is energized through cable 74 and is provided with a suitable starting switch 75 and ballast 76 (Figs. 2 and 5). Housing 70 is slotted at 77 for the passage of light from tube 73. Slot 77 may contain a suitable collimator 78 held in place by clamp 79' to concentrate and straighten the light rays emanating from tube 73. Collimator 78 may be made up of a plurality of translucent rectangular parallelepipeds 79 of relatively small cross sectional area as compared to their length and joined together along their longer sides by opaque cement. It will be readily apparent that the smaller the cross sectional area of the parallelepipeds the straighter will be the light rays passing therefrom.

Hinge elements 72 are so chosen that when housing 70 is rotated from the raised position shown in solid lines in Fig. 1 to lowered position as shown in dotted lines in Fig. 1 slot 77 will register with a slot 80 in housing 10 and light rays emitted from collimator 78 will pass through slot 80. Slot 80 may in turn be provided with a collimator 81 (Fig. 7) of similar construction to collimator 78.

The fibers to be measured, generally indicated at 82, are supported across slot 80 by clamps or combs 83 of known construction as shown in Hertel Patent No. 2,299,983 which are secured to cross arm 26 for movement therewith.

Referring to Fig. 2 an opaque housing 84 is secured above slot 80 and is designed to receive a pair of lenses 85. Lenses 85, best seen in Fig. 7, are formed of suitable translucent material, such as Lucite, and receive the light rays passing through slot 80 and collimator 81 through their rounded and wider ends 86 and concentrate the light rays at their narrower ends 88. Ends 88 may be cut away at an angle to provide a reflecting surface 89 to direct the light rays into suitable light responsive devices here shown as vacuum phototubes 90 and 91, housing 84 being apertured at 92 and 93 to pass the light rays.

Figure 6:
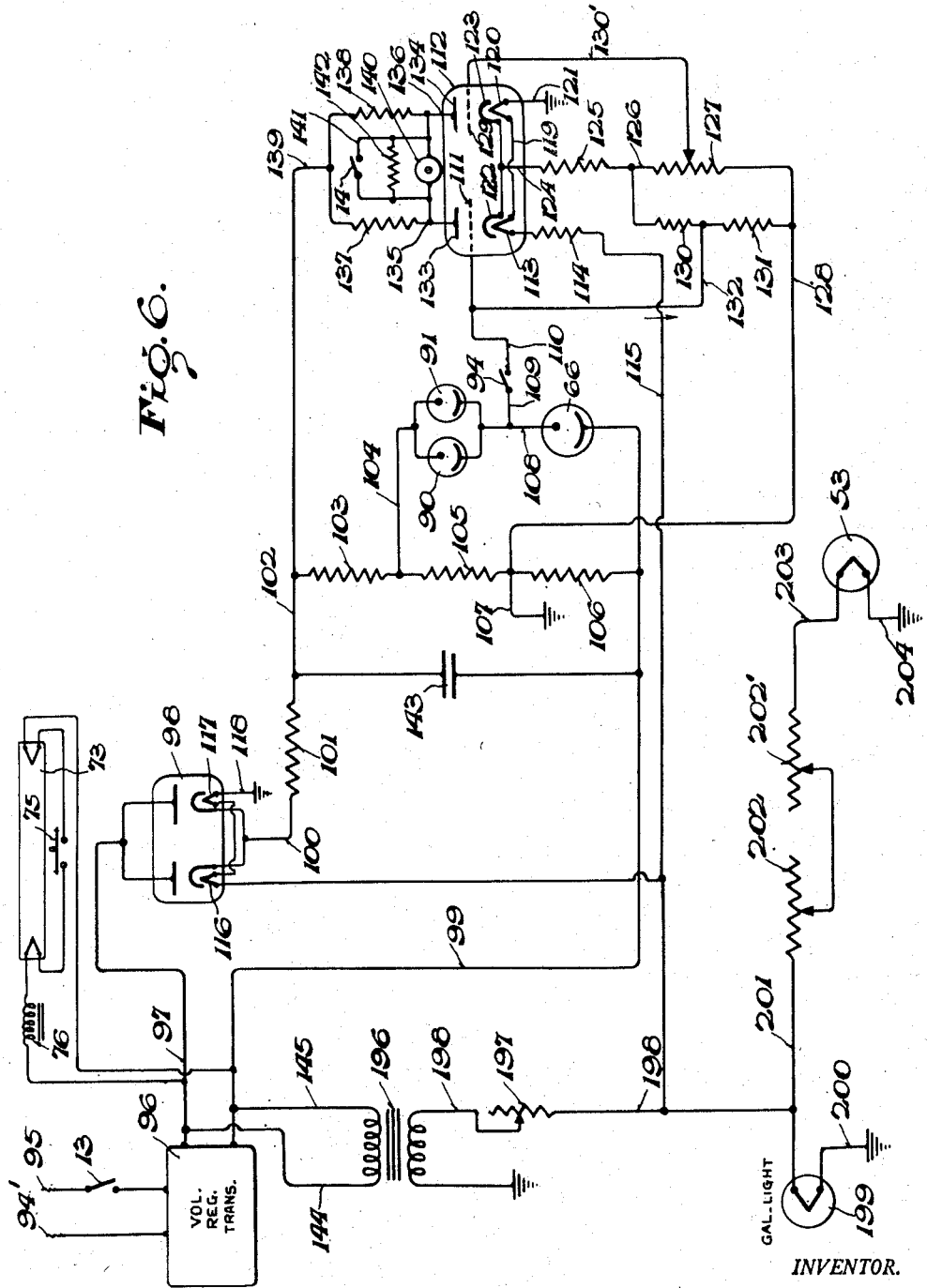
Fig. 6 is a schematic circuit diagram of the novel electric circuit shown in Figs. 1 and 2.

A circuit suitable for use with the present invention is shown diagrammatically in Fig. 6 where 94', 95 is any suitable source of alternating current admitted to voltage regulating transformer 96 through switch 13. One side of the output of transformer 96 is connected by wire 97 to rectifier tube 98 and the other side is connected by wire 99 to tube 66. The output of rectifier 98 is taken by wire 100 through a suitable resistance 101 and wire 102 through a suitable sensitizing resistance 103 to a bridge circuit in which equal resistance 105 and 106 comprise two sides of the bridge grounded at 107 and tubes 90 and 91 and tube 66 comprise the other two sides of the bridge, tubes 90 and 91 being connected in parallel and being connected by wire 104 between resistances 103 and 105 and tubes 90 and 91 and tube 66 being connected in series by wire 108. The sides of the bridge connected by wire 108 are connected by wire 109 to switch 94 and switch 94 is connected by wire 110 to one grid 111 of twin triode tube 112. Filament 113 for grid 111 is connected to a suitable resistance 114 to keep temperatures low to prevent grid emission and resistance 114 is connected by wire 115 to one filament 116 of rectifier 98 and to wire 198 supplying filament voltage. Filament 116 is connected to the other filament 117 of rectifier 98 and filament 117 is grounded at 118.

Filament 119 of tube 112 is connected in series by wire 119 to the other filament 120 of the tube 112 and filament 120 is grounded at 121. Cathodes 122 and 123 of tube 112 are connected by wire 124 to a suitable resistance 125 which is in turn connected by wire 126 to a suitable potentiometer 127 which is connected by wire 128 to ground 107. Grid 129 of tube 112 is connected to potentiometer 127 by wire 130'. A bridge circuit is formed with the two sides of resistance 127 comprising two sides of the bridge and suitable resistances 130 and 131 comprising the other two sides of the bridge, sides 130 and 131 being connected by wire 132 to wire 110 and grid 111. Plates 133 and 134 of tube 112 are connected by wires 135 and 136 to suitable resistance 137 and 138 respectively and resistances 137 and 138 are connected by wire 139 to wire 102. A suitable galvanometer 140 is connected across plates 133 and 134 and has a bridging circuit 141 which includes switch 14 and a suitable resistance 142. Galvanometer 140 is preferably of the conventional reflecting type reflecting light from a suitable source onto a screen 140' (Fig. 1) having suitable indicia for indicating the neutral position of the galvanometer.

A suitable condenser 143 may be connected across the rectifier output and transformer return as by bridging wires 102 and 99 to smooth out the rectifier output.

The output of transformer 96 is connected by wires 144 and 145 to one side of a suitable transformer 196 the other side of which is led through a suitable resistance 197 by wire 198 to a light 199 for galvanometer 140. Light 199 is grounded at 200. Wire 201 leads from wire 199 to variable resistances 202 and 202' which are connected in series and resistance 202' is connected by wire 203 to light source 53 for phototube 66. The other side of light 53 is grounded at 204. As above stated wire 115 is connected to wire 198 to supply voltage to the several filaments of the tubes 98 and 112.

With the novel measuring instrument of the present invention set up and organized as above described the final shape of the surface of the cam 48 to compensate for the difference in functions of the light received by the tubes and for a given instrument and type of fiber is found by the following procedure, it being understood that the approximate shape of this surface is known for the arrangement of parts and circuits as above described. Switch 13 is closed to energize the twin triode tube 112 and lights 53 and 199 and switch 94 is opened. The inputs of tube 112 are then brought into balance by suitable adjustment of potentiometer 127 as indicated by a zero displacement of galvanometer 140. Switch 94 is then closed, panel 41 is moved by hand wheel 46 until the indicia on elements 17 and projection 43 coincide and fluorescent tube 73 is illuminated. The circuit is now balanced by suitable adjustment or variable resistances 202 and 202' to vary the intensity of the light received by tube 66. When more light is received by tubes 90 and 91 than is received by tube 66 a positive potential will be impressed upon grid 111 which will unbalance twin triode tube 112 and this unbalance will be reflected by displacement of galvanometer 140. When more light is received by tube 66 than is received by tubes 90 and 91 a negative potential will be impressed upon grid 111 and twin triode tube 112 will be unbalanced in the opposite direction as reflected by an opposite displacement of galvanometer 140. When the light received by tubes 90 and 91 is equal to that received by tube 66 a zero potential is impressed upon grid 111 and since twin triode tube 112 has previously been balanced this zero potential is reflected by a zero displacement of the galvanometer 140.

Having suitably adjusted resistances 202 and 202' to balance the circuit, standard samples of linen embossed cellophane of known construction and organization such as those described in the Hertel patent are fixed in combs 83 and with combs 83 in their lowest positions. Hand wheel 22 is then rotated to move combs 83 and the standard samples a predetermined distance and handwheel 46 is rotated to move panel 41 by an amount calculated to balance the circuit by moving light 53 away from tube 66 and diminishing the intensity of the light received by tube 66. Any unbalance of the circuit now exhibited by displacement of galvanometer 140 is corrected by modification of the cam surface of cam 48 immediately beneath extension 63 of bell crank lever 60 to move panel 47 and tube 66 toward or away from light 53 as may be required. This procedure is repeated as many times as may be necessary to perfect the shape of the surface of cam 48. Further adjustments may be obtained by moving pin 65 in slot 65' if it is found that greater or lesser rise of cam surface is required. This procedure should be done in the factory and once this cam surface is determined the instrument is adjusted and should require no further adjustment in the hands of the user. In this connection it should be noted that the instrument may be provided with a plurality of cams 48 corresponding to different standard samples which may be readily installed by the user to adapt the instrument for the measurement of various types of fibers. It should further be noted that while for the purposes of clarity the adjustment and operation of this device has heretofore been described in the case where the amounts of light received by the tubes are adjusted to equality that the same results may be obtained when the amounts of light so received are not equal but vary by a known differential.

Controlled conditions of relative humidity should be maintained while adjusting the cam surface of cam 48. The standard samples of linen embossed cellophane have been found to have the property of varying light transmission with changes in relative humidity. More light is transmitted by such samples under conditions of high humidity than is transmitted with the condition of low humidity. This phenomenon may be utilized after calibration of the instrument for a given humidity to measure changes therein or to operate controls to adjust the humidity.

With the cam surface of cam 48 predetermined for a given type of fiber to measure samples of this fiber, cross arm 26 is moved to its lowest position, the indicia on element 17 and projection 43 brought into registration, a card 52 is slipped beneath clip 51 and beneath the pen in holder 40, samples 82 of the fiber to be measured are prepared in known manner on combs 83 as described in the Hertel patent, and switch 13 is closed to energize transformer 96, bulbs 53 and 199, rectifier 98 and twin triode tube 112. Switch 94 is opened and tube 112 is balanced as above described and thereafter fluorescent tube 73 energized and the circuit again balanced as described above. Housing 70 is then rotated to raised position as seen in Fig. 1, combs 83 are attached to cross arm 26 with samples 82 extending downwardly over slot 80 and housing 70 rotated to lowered position as shown in dotted lines in Fig. 1 so that the light from tube 73 will pass through collimator 78, through the samples 82, through collimator 81 and into lenses 86 and tubes 90 and 91. Hand wheel 22 is now rotated to raise cross arm 26 to move the samples 82 through the light passing to tubes 90 and 91 and the intensity of this light varies depending upon fiber length and distribution in the sample. At the same time hand wheel 46 is rotated to move light 53 away from tube 66 to keep the circuit in balance, as above described, with cam 48 imparting movement to panel 57 and tube 66 to automatically provide required corrections. Arm 32 moving with cross arm 26 imparts vertical movement to the pen in holder 40 and card 52 is moved laterally with respect to the pen in holder 40 and the results of these movements are traced on card 52 as a fiber length distribution curve.

After the sample 82 has passed slot 80 card 52 bearing a completed length distribution curve for the sample is removed and may then be analyzed in known manner to show relative numbers of fibers in per cent and fiber length.

It will now be apparent that the present invention provides a novel instrument for measuring the length and distribution of fibers and adapted to the measurement of relative humidities in which the movement of fiber samples through a beam of light received by a light responsive device is coupled with the movement of a source of light with respect to a second light responsive device to equalize or bring to a predetermined differential the light received by the light responsive devices to trace a length distribution curve for the fiber sample; in which corrections for individual instruments, types of fibers and difference in functions of the light admitted to the light responsive devices are automatically supplied by automatically adjusting the position of the second light responsive device with respect to its source of light; in which a novel circuit is utilized for indicating the relative amounts of light received by the light responsive devices; in which novel collimators and lenses are employed to direct and focus the light received by the first light responsive device; and which is simple and easy to use, requiring a minimum of adjustment, and is compact, durable and of dependable and accurate operation.

Changes to and modifications of the above described illustrative embodiment of the present invention may now be suggested to those skilled in the art without departing from the inventive concept. Reference should therefore be had to the appended claims to determine the scope of this invention.

What is claimed is:

1. In an instrument of the type described, a light responsive device, a source of light for said light responsive device, a second light responsive device, a second source of light for said second light responsive device, means for moving a sample of fibers to be measured across the path of light from said first light source, means for moving said second light source with respect to said second light responsive device to bring the amounts of light received by said light responsive devices to a predetermined differential, automatically actuated means movable with said second light source to vary the position of said second light responsive device with respect to the position of said second light source to supply instrument corrections and mechanical means moved by the movement of the sample and by the movement of said second light source for effecting a resultant of the movements of the sample and of said second light source.

2. In an instrument of the type described, a light responsive device, a source of light for said light responsive device, a second light responsive device, a second source of light for said second light responsive device, means for moving a sample of fibers to be measured across the path of light from said first light source, means for moving said second light source with respect to said second light responsive device to bring the amounts of light received by said light responsive devices to a predetermined differential, cam means moved with said second light source, a cam follower engaging said cam means and connected to said second light responsive device to vary the position of said second light responsive device with respect to the position of said second light source to supply instrument corrections and means activated by the movement of the sample and by the movement of said second light source for effecting a resultant of the movements of the sample and of said second light source.

3. In an instrument of the type described having an analysing light responsive device, a movable balancing light responsive device and individual sources of light for the light responsive devices, means for moving the source of light for the balancing light responsive device with respect to the balancing light responsive device to bring the amounts of light received by the light responsive devices to a predetermined differential and correction supplying means including a cam moving with the source of light for the balancing light responsive device and a cam follower engaging said cam and connected to the movable balancing light responsive device to whereby the position of the balancing light responsive device is changed with respect to its source of light as its source of light is moved.

4. In an instrument of the type described a light responsive device and a source of light for said light responsive device, manual means for moving fiber samples across the path of light from said light source, drawing means following the movement of the samples, card supporting means beneath said drawing means, manual means for moving said card supporting means with respect to said drawing means, a second source of light carried by said card supporting means, a second light responsive device adjacent said second source of light, a cam carried by said card supporting means and means engaging said cam and said second light responsive device to vary the position of said second light responsive device with respect to said second source of light.

5. In a circuit for determining the relative amounts of light received by light responsive devices, a bridge circuit including two equal resistances connected in series and two light responsive devices connected in series and connected to form the four sides of the bridge, a twin triode tube, a variable resistance connected to one grid of said tube to balance the tube, means for energizing said grid, means connecting the other grid of said tube to the series connection of the light responsive devices, a galvanometer connected across the plates of said tube and means energizing said bridge circuit, means for energizing said other grid of said tube, means for connecting the series connection of said equal resistances to the filaments of said tube whereby when said tube is balanced any inequality of the amounts of light received by the light responsive devices will unbalance said tube and displace said galvanometer.

6. In an instrument of the type described a light responsive device and a source of light for said light responsive device, manual means for moving fiber samples across the path of light from said light source, drawing means following the movement of the samples, card supporting means beneath said drawing means, manual means for moving said card supporting means with respect to said drawing means, a second source of light carried by said card supporting means, and a second light responsive device adjacent said second source of light.

LOUIS M. PUSTER.

References Cited in the file of this patent

UNITED STATES PATENTS

| Number | Name | Date |
|---|---|---|
| 1,729,517 | Neale | Sept. 24, 1929 |
| 1,963,128 | Geister | June 19, 1934 |
| 2,016,036 | FitzGerald | Oct. 1, 1935 |
| 2,037,044 | Reinartz et al. | Apr. 14, 1936 |
| 2,139,474 | Shepard, Jr. | Dec. 6, 1938 |
| 2,233,879 | Tolman | Mar. 4, 1941 |
| 2,256,595 | Metcalf | Sept. 23, 1941 |
| 2,262,362 | Gulliksen | Nov. 11, 1941 |
| 2,267,544 | Wente | Dec. 23, 1941 |
| 2,299,983 | Hertel | Oct. 27, 1942 |
| 2,300,999 | Williams | Nov. 3, 1942 |
| 2,395,422 | O'Dwyer | Feb. 26, 1946 |
| 2,410,104 | Rainey | Oct. 29, 1946 |
| 2,472,019 | Kinderman | May 31, 1949 |
| 2,490,370 | Neuwirth | Dec. 6, 1949 |